United States Patent [19]
Meier

[11] 3,921,799
[45] Nov. 25, 1975

[54] FIXED LENGTH LOOP-FORMING STRAP AND OVERLAP JOINT THEREFOR

[75] Inventor: William A. Meier, Hoffman Estates, Ill.

[73] Assignee: Signode Corporation, Glenview, Ill.

[22] Filed: Aug. 16, 1974

[21] Appl. No.: 497,867

[52] U.S. Cl. .............. 206/83.5; 24/23 W; 100/3; 206/451
[51] Int. Cl.² .............. B65D 71/00; B65D 63/06
[58] Field of Search ........... 24/20 R, 20 TT, 20 EE, 24/20 W, 21, 22, 23 W, 23 EE, 23 B, 23 R, 30; 206/83.5, 451

[56] References Cited
UNITED STATES PATENTS

| 293,919 | 2/1884 | Sprout | 24/22 |
| 403,178 | 5/1889 | Cary | 24/22 |
| 2,035,351 | 3/1936 | Taylor | 24/20 EE |
| 3,267,535 | 8/1966 | Martin et al. | 24/23 W |
| 3,349,442 | 10/1967 | Buy | 24/23 W |

FOREIGN PATENTS OR APPLICATIONS

| 125,306 | 12/1918 | United Kingdom | 24/21 |

Primary Examiner—Paul R. Gilliam
Assistant Examiner—Kenneth J. Dorner

[57] ABSTRACT

A baling strap of predetermined length and having a lateral offset adjacent one end thereof designed for face-to-face overlapping reception of the opposite end region of the strap to the end that one or more metal seals may be crimped over the strap overlap, thus creating a strap overlap joint defining a fixed circumference strap loop. A strap overlap joint embodying such a lateral offset. A method of creating the overlap joint wherein the overlapping ends of the strap loop are manually retained and a seal is employed to complete the interlocking engagement prior to final crimping of the seal.

8 Claims, 17 Drawing Figures

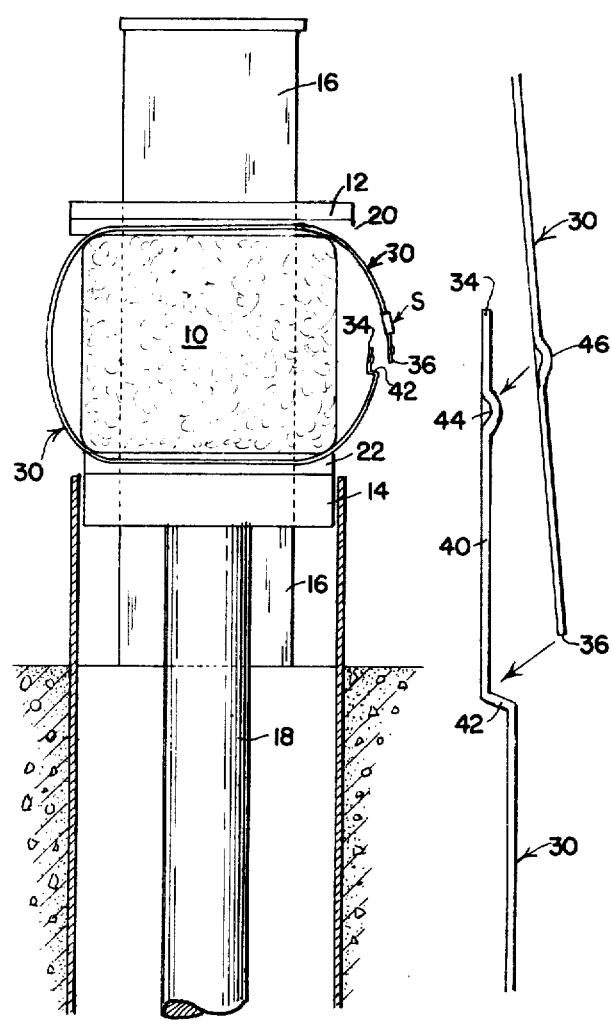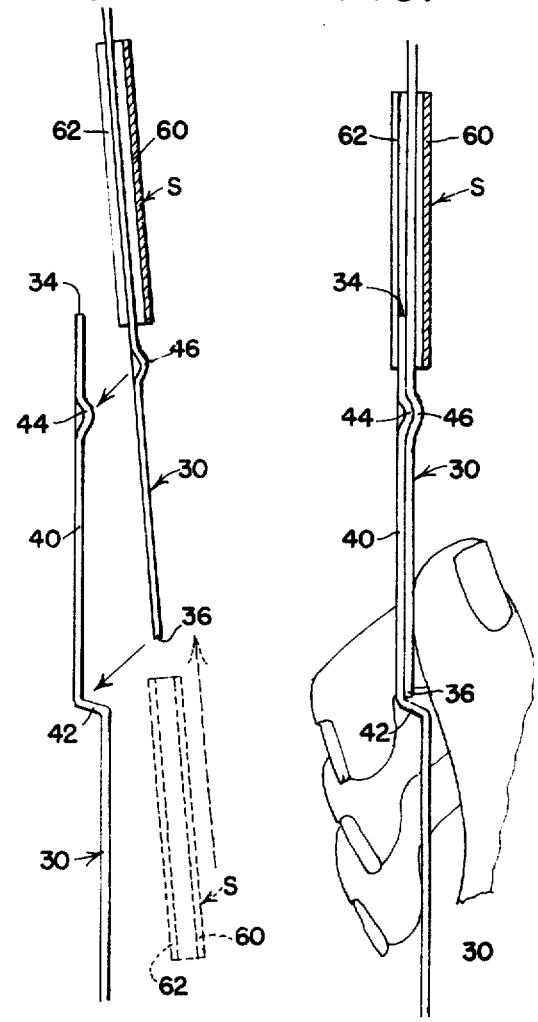
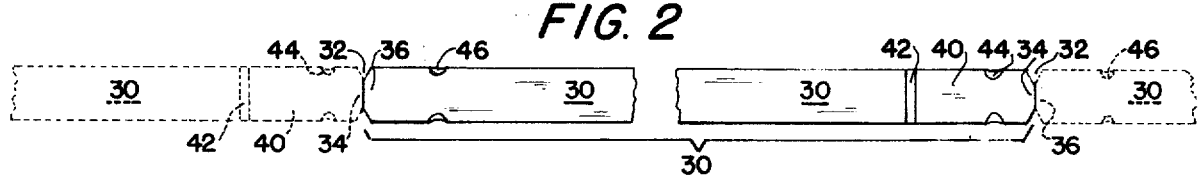
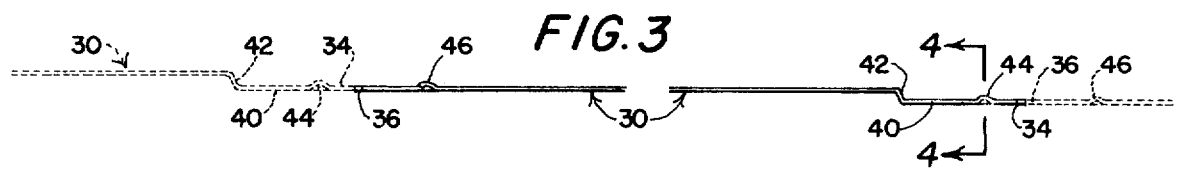
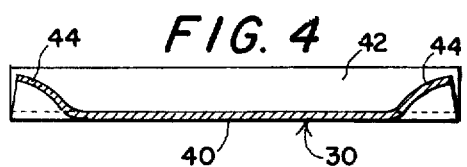

FIXED LENGTH LOOP-FORMING STRAP AND OVERLAP JOINT THEREFOR

The improved baling strap and overlap joint comprising the present invention has been designed for use primarily in connection with the banding of cotton or other springy fibrous bales. The invention is, however capable of other uses and, if desired, the same may be employed, with or without modification as required, for strapping all manner of bundles, packages or other articles, whether the same be compressible or otherwise. Irrespective however of the particular use to which the invention may be put, the essential features thereof remain substantially the same.

In the cotton baling industry, where manual strapping operations are concerned, three general types or methods of applying balding straps to a compressed cotton bale are currently in use. According to one method, continuous steel strapping issuing from a dispenser is passed around the bale, the free end of the strapping is then caused to overlap the feed end of the strapping loop, and thereafter the operator applies a conventional strapping tool to the loop overlap, the tool having facilities for automatically tensioning the loop, applying a metal seal to the loop overlap, and finally severing the excess strapping of the loop from the strapping source. This method of baling is usually embodied in fully automatic bale strapping apparatus inasmuch as manipulation of a pneumatic strapping tool which contains the necessary seal magazine, seal feeding structure, seal crimping jaws and other adjuncts is difficult due principally to the weight of the tool. If separate hand tensioning, sealing and strap severing tools are employed, the interchange of tools entails considerable operator activity.

Another method of applying straps to cotton bales is predicated upon the use of sealless strap connections which splice the overlapped ends of the strapping loop together. When employing such method of straps are cut to a predetermined length and interlocking tongues, or tongue and groove connections of a wide variety are employed for effecting the overlap seal.

The most prevalent method which is employed in the baling industry where manual operations are concerned resides in the use of so-called buckles, of which there are several types. Essentially these buckles function in the same manner in that they employ dual slots, one for each free end of a precut length of strapping. The free end regions of the strap loop are inserted into the slots and when the desired degree of loop shrinking has been attained, these ends are bent in reentrant fashion through an angle of 180° with the free ends lying inside the loop and against the bale. When bale compression is released, the friction which is generated between the reentrant overlaps is relied upon largely to maintain strap tension. Additionally, in the manufacture of the buckles, the edges of the slots are coined so that they are rough, thus assisting in preventing strap slippage and maintaining the loop tension. The buckles are reuseable. This latter method of bale strapping is possessed of certain limitations, principal amount which is the fact that with high density bales, slippage frequently does occur despite the fact that it is customary to utilize a reentrant overlap at each end of the strap loop on the order of eight inches. Furthermore, since the buckles are reuseable, after a prolonged period of successive uses, the cointed edges of the slots become worn, this being conducive to slippage. Still further, where side entry slots are provided in the buckles, high tension in the strap loop may deform the buckles to such an extent that the strap will pull loose altogether. Additionally, the use of a total of sixteen inches of excess strapping to produce the reentrant bends represents a considerable waste of strapping material. Finally, application of such buckles to the ends of the strap loop and the reentrant bending of the metal strap material results in relatively high labor costs since the operation is not easily accomplished.

The present invention is designed to overcome the abovenoted limitations that are attendant upon the practicing of conventional base strapping methods such as have been briefly outlined above and, toward this end, the invention contemplates the provision of a novel fixed length loop-forming strap which may be shaped in quantity by a simple stamping or pressing operation and which, when applied to a compressed bale in a baling press, presents end portions which facilitate handling by the operator in such a manner that with a minimum of attention he may correctly bring the free ends together in precise overlapping register so as to form a loop of fixed invariable size about the bale, maintain such register with only light finger pressure of one hand while a metal seal is applied to the overlap with the other hand to complete an interlocking engagement, release the manual pressure as soon as the interlock is effected with no danger of overlap slippage and then utilizing only a light seal crimping tool effect the seal-crimping operation, after which bale compression may be released.

Briefly, in carrying out the invention, it is contemplated that one end region of the fixed length strap be provided with a lateral offset of slight displacement, such offset defining a short offset web by means of which it is joined to the main body of the strap. This lateral offset is provided with an outstruck boss which when a strap loop is created and the overlap is effected, registers with a complementary boss on the other end region of the strap, while the offset web establishes a shoulder against which such other end of the strap abuts, thus assisting the operator in effecting proper boss register, even under conditions of poor lighting. The overlap is made with the offset facing inwardly against the bale. As soon as the operator effects the desired strap loop overlap, slight manual pressure against the outer overlap portion serves to hold the strap ends together so that a conventional metal seal which previously was slipped over the strap may be slid into position over the registering bosses to hold the ends of the strap together and maintain the overlap secure, after which the operator may release his grasp and slide the seal to a final position against the offset web. Thereafter, utilizing a light hand sealer, the seal may be crimped in position. In a preferred form of the invention, the longitudinal extent of the lateral offset is approximately equal to the length of the seal which is applied to the strap loop overlap so that the seal extends only from the offset web to the registering bosses. In another form the longitudinal extent of the offset is approximately twice that of a seal with the registering bosses being disposed midway between the web and the bosses so that the seal need not be slid completely to the shoulder-forming web but, instead, may be slid only to the registering bosses where it is then crimped on the loop overlap on the side of such bosses remote from the web. In a further form, utilizing such a dual length offset, two seals may be initially slipped onto the strap and then slid onto the overlap in straddling relation relative to the bosses. In a fourth modification of the invention, still utilizing a dual length offset, a single elongated seal of substantially full offset extend is slid over the offset and crimped on opposite sides of the registering bosses.

The provision of a fixed length loop-forming strap and overlap joint therefor such as has briefly been set forth above in various forms, and possessing the stated advantages, constitutes the principal object of the present invention. Other objects and advantages of the invention, not as this time enumerated, will readily suggest themselves as the nature of the invention is better understood.

In the accompanying two sheets of drawings forming a part of this specification, several illustrative embodiments of the invention have been shown.

IN THESE DRAWINGS

FIG. 1 is a sectional view, entirely shcematic in its representation, taken substantially centrally and longitudinally through the press box region of a conventional baling press and showing a preformed unit strap length disposed in bale-encircling, loop-forming relation preparatory to uniting the free ends thereof by the application thereto of a metal seal;

FIG. 2 is a fragmentary plan view of a continuous extent of strapping material embodying consecutive unit strap lengths such as that which is shown in FIG. 1;

FIG. 3 is a side elevational view of the structure shown in FIG. 2;

FIG. 4 is a further enlarged sectional view taken on the line 4–4 of FIG. 3;

FIG. 5 is an enlarged fragmentary side elevational view of the free end region of the strap loop of FIG. 1 and illustrating schematically the manner in which the loop ends are brought together in overlapping relationship preparatory to application of a seal thereto according to a preferred form of the invention;

FIG. 6 is a side elevational view, similar to FIG. 5, illustrating the manner in which a single uncrimped seal is applied to the upper free end region of the strap loop, the seal being shown in longitudinal section;

FIG. 7 is a side elevational view, similar to FIGS. 5 and 6 showing the free end regions of the strap length fully juxtapositioned and manually held in position, with the uncrimped seal slid downwardly toward its final position on the strap overlap.

Figure 8:
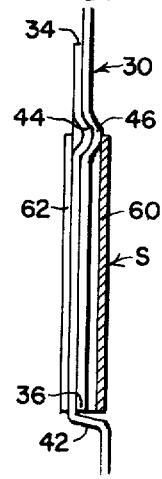
FIG. 8 is a side elevational view, similar to FIG. 7, showing the uncrimped seal moved to its final position on the strap overlap.

Referring now to the drawings in detail and in particular to FIG. 1 wherein the press box region of a conventional baling press is schematically illustrated, a bale 10 of cotton or other springy fibrous material is shown as undergoing compression between upper and lower press platens 12 and 14, the upper platen being fixedly mounted on a beam 16 which constitutes an element of the press framework and the lower platen being vertically shiftable and being carried at the upper end of the press ram 18. As is conventional in connection with the baling presses of the type under consideration, the upper platen 12 is provided with a plurality of transversely extending downwardly facing laterally spaced guide channel or chutes 20, while the lower platen 14 is similarly provided with upwardly facing registering guide channel or chutes 22, only one pair of registering chutes being disclosed herein. It will be understood that the number of parts of chutes employed will be commensurate with the number of straps which are to be applied to the bale 10.

It will be evident that whether predetermined precut lengths of strapping, or continuous strapping issuing from a suitable source such as a strapping dispenser, are employed for creating the various strap loops about the bale, it is customary where manual operations are concerned for a first operator on the front side of the baling press to insert the leading end of the strapping endwise into the chute 20 and thus pass the strapping to a second operator at the rear of the press. The second operator will then insert such leading end endwise into the chute 22 and pass it back to the first operator who will then complete the strap loop about the bale by establishing a loop overlap, applying a metal seal to such overlap and crimping the seal.

According to the present invention in a preferred form thereof, predetermined lengths of strapping material are employed for establishing the various strapping loops about the bale 10, one such length being shown in FIG. 1 and designated in its entirety at 30. These lengths of strapping 30 may be supplied as individual manufactured units, or they may be supplied in the form of a tandem array of unit lengths as shown in FIG. 2 and which are contained in a continuous coil of involutely wound strapping. Suitable notches 32 are formed in opposed relationship along the strapping edges to facilitate breaking off of each unit length as the same is required for strapping purposes by the operator. Irrespective however of the manner in which the unit lengths are manufactured, such lengths remain substantially the same.

Considering now one of the unit lengths 30, and referring particularly to FIGS. 2, 3 and 4, such lengths is in the form of an elongated strip of normally flat ribbon-like metal strapping having what will hereinafter be referred to as a leading end 34 and a trailing end 36.

The term "leading end" is predicated upon the fact that it is the end of the unit length 30 which is fed into the guide channel 20 by the first operator so that it thus leads the other or "trailing" end of the unit length.

The strapping as a whole may be coiled involutely in either direction. Preferably however, it is would upon a reel so that the leading end 34 of each unit length 30 becomes the free end of the coil while the trailing end becomes the feed end for break-off prupuses.

Figure 16:
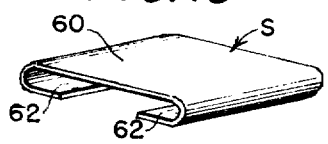
FIG. 16 is an enlarged perspective view of the uncrimped metal seal or blank which is employed in connection with the forms of the invention shown in FIGS. 8, 10 and 14.

The leading end region of each unit length (which length will hereinafter be referred to simply as the strap) is provided with an offset region 40 which is removed from the general plane of the strap by a slight distance and which is joined to the main body of the strap by an offset web 42 (see also FIG. 5) which is shown herein as having in inclination on the order of 60° but which may have other inclinations if desired. The longitudinal extent of the offset region 40 is approximately equal to, or slightly greater than, that of a conventional seal such as that which is shown in FIG. 16 and designated at S. The reason for such dimentional relationship between the offset region 40 and the seal S will become apparent as the following description ensues.

At a region which is closely adjacent to the leading end 34 of the strap 30, there are formed a pair of opposed marginal humplike protuberances or bosses 44 (see also FIG. 4), such bosses projecting out of the general plane of the offset region 40 in the same direction as that of the offset web 42 and intersecting the marginal edges of the strap. These bosses 44 are designed for nesting engagement with a pair of similar marginal recesses or bosses 46 as shown in FIG. 5 when the strap 30 is fed through the chutes 20 and 22 and caused to encircle the bale 10 to form a closed loop. Accordingly, the marginal bosses 46 are disposed on the strap edges at approximately the same distance from the trailing end 36 as the bosses 44 are spaced from the leading end 42. Thus when the bosses 44 and 46 are nested, the trailing end 36 lies close to the juncture region between the offset web 42 and the main body of the strap as clearly shown in FIG. 7.

In the preferred form of the invention, bale strapping operations are carried out by the two operators on opposite sides of the baling press, the first operator initially passing the leading offset region 40 of the strap 30 through the guide channel 20 (FIG. 1) to the second operator who then passes such leading end region back to the first operator through the guide channel 22. The first operator then brings the two free end regions of the strap into approximate over lapping relation as shown in FIG. 5 and subsequently causes a seal S such as is shown in dotted lines in FIG. 6 to be slipped in telecopic fashion upwardly over the trailing end 36 of the strap to the full line position thereof wherein such seal assumes an elevation entirely above the uppermost leading end 34 of the strap. Thereafter, the first operator grasps the two free end regions of the strap 30 as shown in FIG. 7 and creates the aforementioned loop overlap with the two pairs of bosses 44 and 46 assuming their nested relationship. While thus holding the overlap, the first operator allows the seal S to fall by gravity onto the nested bosses 44 and 46, after which he may release his grip upon the overlap and push the seal downwardly to its final position wherein the lower edge thereof engages the shoulder which is afforded by the offset web 42 as shown in FIG. 8. Finally, the first operator will apply a suitable seal-crimping tool to thus positioned seal S, thereby crimping the same against the overlap and effecting notching of the seal as indicated at 50 in FIG. 9.

The particular seal S disclosed herein is purely conventional and it embodies a crown portion 60 having reentrant side flanges 62 which, when the seal is crimped, are forced upwardly toward the crown portion 60 so as to tightly engage the strap loop which is disposed within the confines of the seal.

Various commercial seal crimping and notching tools are available for use by the operator for effecting the crimping and notching of the seal S and, as a consequence no specific tool has been illustrated herein. One particular tool which is capable of performing the necessary crimping and notching operation is shown and described in U.S. Pat. No. 3,550,646, granted on Dec. 29, 1970 and entitled "Sealing Mechanism for Strapping Machines." It is to be noted at this point that after the seal S has been effectively applied to the overlap only a minimum amount of the metal of the offset portion 40 projects upwardly beyond the upper edge of the seal S so that there is practically no excess strapping waste as is the case when conventional strapping loops are employed.

Figure 9:
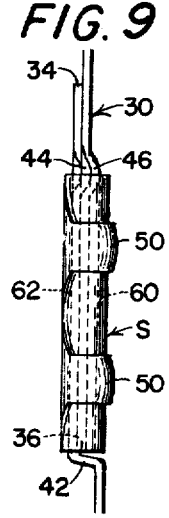
FIG. 9 is a side elevational view of the structure shown in FIG. 8, showing the seal in elevation and fully crimped on the strap overlap.
Figure 10:
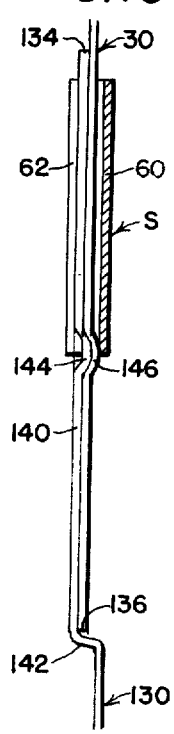
FIG. 10 is a side elevational view, similar to FIG. 7, showing a modified form of strap unit and wherein the free ends of the unit are fully juxtapositioned with the uncrimped seal slid downwardly and moved to a different final position on the strap overlap.
Figure 11:
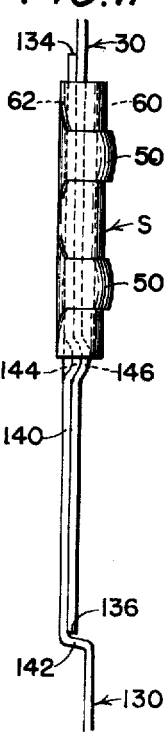
FIG. 11 is a side elevational view, of the structure shown in FIG. 10, showing the seal in elevation and fully crimped on the strap overlap.

In FIGS. 10 and 11, a slightly modified form of unit length of strapping 130 is fragmentarily disclosed, only the overlapping free end region thereof being illustrated. Due to the similarly between the unit length of strapping 130 and the previously described unit length of strapping 30, and in order to avoid needless repetition of description, similar reference numerals but of a higher order have been applied to the corresponding parts as between the disclosures of FIGS. 10 and 11 on the one hand and FIGS. 8 and 9 on the other hand.

The only difference between the strap 30 and the strap 130 resides in the fact that the laterally offset portion 140 of the strap 130 is appreciably longer than the offset portion 40. Specifically the offset portion 140 is approximately twice the length of the offset portion 40 so that the seal S, instead of being pushed completely downwardly to the offset web 142 is dropped by gravity to its point of engagement with the nested marginal bosses 144 and 146, it being understood of course that the operator will handle the free end regions of the strap loop in the manner previously described in connection with FIGS. 5 to 9 inclusive. The seal S is crimped and notched in position with its lower edge resting on the nested marginal bosses 144 and 146 as shown in FIG. 9, thus leaving the portion of the offset 140 below these bosses exposed. As is the case in connection with the straps 40, the seal S on the overlap of the strap 140 is crimped and notched as indicated at 50 so as to avoid the nested bosses 144 and 146.

Figure 12:
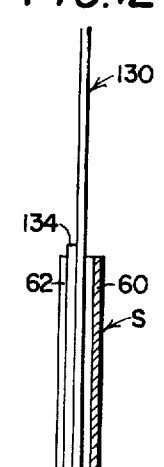
FIG. 12 is a side elevational view, similar to FIG. 10, but showing two uncrimped seals applied to the strap loop overlap and in its final position.
Figure 13:
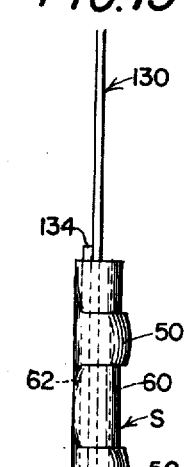
FIG. 13 is a side elevational view of the structure shown in FIG. 12, showing the two seals in elevation and fully crimped on the strap overlap.

In FIGS. 12 and 13 another form of the invention is disclosed wherein the unit strapping length 140 remains precisely the same as the unit length shown in FIGS. 10 and 11 but in which two seals S are applied to the loop overlap, such seals straddling the nested marginal bosses 144 and 146. In establishing this form of seal, the operator, instead of threading a single seal S onto the trailing end region of the strap loop, applied two such seals in a manner similar to the manner in which the single seal was applied according to the disclosure of FIG. 6. Thereafter, these two seals are allowed to fall by gravity until the lower seal engages the nested marginal bosses 144 and 146, after which the lower seal is manually shifted downwardly until it comes to rest on the offset web 142 while the upper seal falls by gravity onto the nested bosses. Seal crimping and notching is effected on both seals S as shown in FIG. 13, each seal being provided with two notches. Again, as is the case with the previously described forms of overlap sealing, only a small limited amount of excess strapping projects above the level of the upper seal S.

Figure 14:
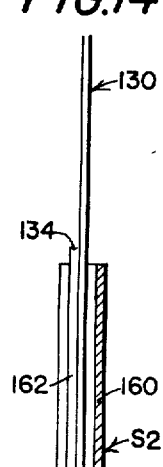
FIG. 14 is a side elevational view, similar to FIG. 12, showing another modified form of the invention wherein a single elongated uncrimped metal seal is applied to the strap loop overlap.
Figure 15:
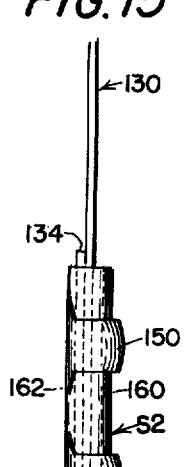
FIG. 15 is a side elevational view of the structure shown in FIG. 14, showing the elongated metal seal fully crimped on the strap loop overlap.

In yet another form of the invention as disclosed in FIGS. 14 and 15, the strap 140 remains the same as the strap shown in FIGS. 10 to 13 inclusive but, instead of applying two seals S to the loop overlap as is the case in connection with the overlap sealing shown in FIG. 13, a single elongated seal S2 is applied, such seal having its lower edge in engagement with the offset web 142 with the upper edge thereof disposed slightly below the leading end 134 of the strap 130.

The progressive schematic disclosures of FIGS. 5 to 9 inclusive are generally indicative of the manner in which the strap 130 is fashioned into an encircling loop about the bale 10, the free ends thereof brought into overlapping relationship, and the seal S2 applied to such seal overlap and therefore it is deemed unnecessary to repeat the description of the operation, it being necessary only to bear in mind that the strap 130 is used in place of the strap 30 and that the elongated seal S2 is slipped over the upper free end of the strap loop as shown in FIG. 6 instead of the short seal S.

Figure 17:
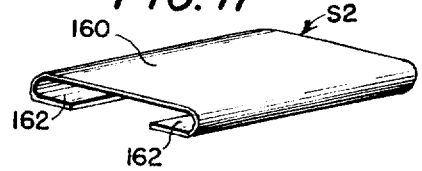
FIG. 17 is an enlarged perspective view of the uncrimped metal seal or blank shown in FIG. 11.

The invention is not to be limited to the exact arrangement of parts shown in the accompanying drawings or described in the specification as various changes in the details of construction may be restored to without departing from the spirit of the invention. Neither is it to be limited to the precise method involved in effecting the various sealed overlaps of the invention. For example, although in the disclosure of FIG. 1 and in the description of the method involved in feeding the strap 30 through the platen chutes 20 and 22, the offset portion 40 of the strap is considered to represent the leading end of the strap, it is within the scope of the invention to reverse the leading and trailing ends of the strap by feeding the end 36 through the lower chute 22 and then feeding it back through the chute 20, in which case the net result will by the same insofar as further strap handling and seal applying operations are concerned, and also between the disclosures of FIGS. 16 and 17. It is also within the scope of the invention for a single operator to feed both ends of the strap simultaneously through to chutes 20 and 22 in one direction from one side of the bale and subsequently walk to the opposite side and establish the overlap joint in the manner previously set forth. Under certain circumstances it may be found expedient to reverse the direction of strap curvature when encircling the bale so that the strap offset 40 lies on the outside of the seal overlap and in engagement with the crown portion 160 of the seal S. Furthermore, although in all of the described modified forms of the invention a small amount of strap overhang remains projected above the upper edge of the seal, it is not essential that the strap projects above the upper edge of the seal, the only criterion being that the offset 40 shall not be so short that the nested marginal bosses 144 and 146 interfere with the crimping operation. Finally, it is not essential that the nested bump-like bosses 44 and 46 marginal bosses and, if desired, such nested bosses may be in the form of wholly contained dimples, suitably disposed in the medial regions of the strap offset as well as in the body of the strap near the trailing end thereof. Therefore, only insofar as the invention has particularly been pointed out in the accompanying claims is the same to be limited.

Having thus described the invention, what I claim and desire to secure by Letters Patent is:

1. A precut strap of uniform width and adapted to encircle an article undergoing strapping, one end region of the strap having a lateral offset which is parallel with and connected to the main body of the strap by a short transversely extending web, the other end region of said strap being designed for coextensive face-to-face overlapping mating engagement with the entire extent of said lateral offset with its extreme end disposed in contiguous relationship relative to the web, said one end region being provided with at least one outstruck protuberance a short distance from its extreme end and the other end region being provided with at least one cooperating outstruck recess which is removed from the extreme end of said other region by a distance which is substantially equal to the distance between said web and the protuberance, said protuberance and recess being designed for interlocking engagement with each other when said end regions of the strap are in mating engagement with each other, said other end region and lateral offset being designed for reception thereover of a metal seal.

2. A precut strap as set forth in claim 1, wherein the protuberances and recesses on the respective end regions of the strap are two in number and are in the form of outstruck bosses which are disposed in transversely opposed paired relationship along the marginal edges of the strap and in intersection relation with respect to such edges.

3. In a baling installation, in combination, a bale of compressible material, a preformed banding strap of uniform width encircling said bale, establishing a closed loop therearound and having vertical upper outer and lower inner end regions disposed in overlapping relationship on one vertical side of the bale, said lower end region being provided with an outwardly extending lateral offset which is parallel with and connected to the main body of the strap by a short web, the upper end region of said strap being disposed in face-to-face overlapping engagement with the entire extent of said offset on the outer side thereof and with its extreme end disposed in contiguous relationship relative to the upper side of the web, said lower end region being provided with an outwardly extending protuberance and the upper end region being provided with a cooperating recess into which said protuberance projects in interlocking relationship and which is removed from the extreme end of said upper end region by a distance which is substantially equal to the distance between said web and the protuberance, and a metal seal telescopically received over said end regions, said seal having a crown portion bearing against the inner side of said upper end region, and reentrant side flanges which are forcibly crimped against the inner side of said lower end region.

4. In a baling installation, the combination set forth in claim 7, wherein said protuberance and recess are established by the provision of nested outstruck bosses on the offset and upper end region respectively.

5. In a baling installation, the combination set forth in claim 4, wherein said nested bosses are displaced upwardly from said web by a distance substantially equal to the length of said seal, and said seal spans the distance between said web and nested bosses.

6. In a baling installation, the combination set forth in claim 5, wherein a second and similar seal is telescopically received over said end regions, said second seal being disposed with its lower edge in contiguous relationship with respect to said nested bosses.

7. In a baling installation, the combination set forth in claim 3, wherein said proturberance and recess are established by the provision of nested outstruck bosses on the offset and upper end region respectively, said seal is disposed with its lower edge in contiguous relationship with respect to said nested bosses.

8. In a baling installation, the combination set forth in claim 3, wherein said proturberance and recess are established by the provision of nested outstruck bosses on the offset and upper end region respectively, said bosses are displaced upwardly from said web by a distance substantially equal to one-half the length of said seal, and the reentrant flanges are crimped in localized regions above and below said bosses.

* * * * *